US011360814B2

(12) United States Patent
Kim et al.

(10) Patent No.: US 11,360,814 B2
(45) Date of Patent: Jun. 14, 2022

(54) SERVER AND CONTROL METHOD FOR DEFINING ACCELERATED COMPUTING ENVIRONMENTS BASED ON CODE INFORMATION AND HARDWARE TYPE

(71) Applicant: Samsung Electronics Co., Ltd., Suwon-si (KR)

(72) Inventors: Taejeong Kim, Suwon-si (KR); Kyunam Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 16/436,223

(22) Filed: Jun. 10, 2019

(65) Prior Publication Data
US 2020/0241924 A1 Jul. 30, 2020

(30) Foreign Application Priority Data

Jan. 29, 2019 (KR) .................. 10-2019-0010992

(51) Int. Cl.
*G06F 9/50* (2006.01)
*G06N 20/00* (2019.01)
*G06F 9/38* (2018.01)

(52) U.S. Cl.
CPC .......... *G06F 9/5011* (2013.01); *G06F 9/3877* (2013.01); *G06N 20/00* (2019.01)

(58) Field of Classification Search
None
See application file for complete search history.

(56) References Cited

U.S. PATENT DOCUMENTS

| 8,397,306 | B1 | 3/2013 | Tormasov |
| 8,839,455 | B1 | 9/2014 | Tormasov |
| 8,935,671 | B2 | 1/2015 | Sowerby et al. |
| 8,943,474 | B1* | 1/2015 | Basumallik ........... G06F 9/4552 717/114 |
| 9,075,913 | B2 | 7/2015 | Bourd et al. |
| 9,317,282 | B2 | 4/2016 | Mun et al. |
| 9,866,551 | B2 | 1/2018 | Hwang et al. |
| 2004/0111493 | A1* | 6/2004 | Yamaguchi ........ H04N 1/00145 709/219 |
| 2014/0035937 | A1* | 2/2014 | Stefansson ............ G06F 9/5072 345/505 |
| 2015/0350348 | A1* | 12/2015 | Yin ........................ H04W 4/70 709/202 |

(Continued)

FOREIGN PATENT DOCUMENTS

KR 10-1195413 B1 10/2012
KR 10-2018-0027031 A 3/2018

*Primary Examiner* — Meng Ai T An
*Assistant Examiner* — Zujia Xu
(74) *Attorney, Agent, or Firm* — Jefferson IP Law, LLP

(57) ABSTRACT

A server and a method for executing an application are provided. The method includes receiving code associated with an application uploaded from a terminal device, transmitting, to a service server, code information associated with the application, receiving, from the service server, execution information for executing the application acquired based on the code information, defining the accelerated computing environment for executing the application based on the received execution information, and executing the application in the compiled accelerated computing environment.

8 Claims, 7 Drawing Sheets

(56) References Cited

U.S. PATENT DOCUMENTS

| | | | |
|---|---|---|---|
| 2016/0094483 A1* | 3/2016 | Johnston | G06F 8/65 709/226 |
| 2017/0148431 A1 | 5/2017 | Catanzaro et al. | |
| 2018/0085763 A1 | 3/2018 | Leckner | |
| 2018/0098137 A1 | 4/2018 | Saha et al. | |

* cited by examiner

| Environment Request Option | |
|---|---|
| GPU | ○1  ○2  ●4  ○8  ○more  [Select GPU numbers ▼] |
| OS | ●Ubuntu    ○Centos<br>[Version 16.04 ▼] |
| CUDA | [Version 9.1 ▼]   Python   [Version 3.5 ▼] |
| ML Framework | ●Tensorflow   ○Caffe<br>[Version 1.8 ▼] |
| Data | ●Common Data   ○custom Data<br>[ResNet-50 ▼] |
| Model | ●Common Repo.   ○custom Repo.<br>[Face-0.7 ▼] |
| Training Code | ●Github Repo.   ○custom Repo.<br>[https://github.com/karim76/face-detect-algorithm ▼] |

| Environment Request Option | |
|---|---|
| GPU | ○ 1  ○ 2  ○ 4  ○ 8  ● more [32 ▼] |
| OS | ● Ubuntu    ○ Centos <br> [Version 16.04 ▼] |
| CUDA | [Version 9.1 ▼]  Python  [Version 3.5 ▼] |
| ML Framework | ○ Distributed Tensorflow ● Horovod <br> [Version 0.15.1 ▼] |
| Data | ● Common Data    ○ custom Data <br> [ResNet-50 ▼] |
| Model | ● Common Repo.    ○ custom Repo. <br> [Face-0.7 ▼] |
| Training Code | ● Github Repo.    ○ custom Repo. <br> [https://github.com/karim76/face-detect-algorithm ▼] |

SERVER AND CONTROL METHOD FOR DEFINING ACCELERATED COMPUTING ENVIRONMENTS BASED ON CODE INFORMATION AND HARDWARE TYPE

CROSS-REFERENCE TO RELATED APPLICATION(S)

This application is based on and claims priority under 35 U.S.C. § 119(a) of a Korean patent application number 10-2019-0010992, filed on Jan. 29, 2019, in the Korean Intellectual Property Office, the disclosure of which is incorporated by reference herein in its entirety.

BACKGROUND

1. Field

The disclosure relates to a server and a control method for providing accelerated computing environments in a cloud environment.

2. Description of Related Art

A cloud computing environment is a service environment that provides a plurality of terminal devices in communication with the cloud computing environment with shareable computer processing resources and data available to the plurality of terminal devices.

Therefore, a user can access the cloud computing environment through a terminal device, such as a personal computer (PC), and defines an environment for executing an application developed by the user using the resources provided in the accessed cloud environment.

However, because a cloud computing service may not support all possible hardware (H/W) configurations the cloud computing service may not provide various accelerated computing environment services. Alternatively, in a case that the cloud computing service is capable of providing various accelerated computing environment services, there is a problem that much time and cost are incurred because the user directly participates in most of the processes of identifying and selecting the resources required for executing the application developed by the user and defining the environment for executing the application by using the selected resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a server providing various accelerated computing environments for selecting a resource suitable for executing an application and automatically defining an accelerated computing environment based on the selected resource.

Additional aspects will be set forth in part in the description which follows and, in part, will be apparent from the description, or may be learned by practice of the presented embodiments.

In accordance with an aspect of the disclosure, a method of a server for executing an application in a cloud environment is provided. The method includes receiving code associated with an application uploaded from a terminal device, transmitting, to a service server, code information associated with the application, receiving, from the service server, execution information for executing the application acquired based on the code information, defining the accelerated computing environment for executing the application based on the received execution information, and executing the application in the compiled accelerated computing environment.

The execution information for executing the application includes at least one of hardware (H/W) type information, execution language information, or framework for executing the application.

The H/W type information includes at least one of graphics processing unit (GPU), numeric processing unit (NPU), or vision processing unit (VPU), and the execution language includes at least one of a first execution language that requires compilation or a second execution language that does not require compilation.

In the executing of the application, when the execution language for the application is the first execution language that requires compilation, the application is compiled in the accelerated computing environment and be then executed through the accelerated computing environment, and when the execution language for the application is the second execution language, the application is executed through the accelerated computing environment.

The first execution language includes at least one programming language of C language and Java or a language that requires compilation, and the second execution language includes at least one programming language of Python and NodeJS or a language that does not require compilation.

The code information of the application is information for executing the application set by a user through a user interface (UI) provided by the user terminal device.

The UI includes at least one of a first icon for setting H/W, a second icon for setting an operating system (OS), a third icon for setting a programming language, a fourth icon for setting a software environment, a fifth icon for storing data, a sixth icon for setting a location to store a derived learning model, or a seventh icon for setting a source code for an algorithm used for learning in the learning model.

In the executing of the application, address information for providing an execution result of the application is transmitted to the user terminal device, and when an access request to the address information is received from the user terminal device, the execution result of the application is be provided through the accelerated computing environment.

In accordance with another aspect of the disclosure, a server for providing an accelerated computing environment in a cloud environment is provided. The server includes a communicator configured to include a circuit, a memory configured to include at least one instruction, and a processor configured to execute the at least one instruction, wherein the processor is configured to control the communicator so as to transmit code information on an application to a service server when the application uploaded from a user terminal device is received through the communicator, and define an accelerated computing environment for executing the application based on received execution information, when the execution information for executing the application acquired based on the code information is received from the service server, and execute the application in the compiled accelerated computing environment.

The execution information for executing the application includes at least one of H/W type information, execution language information, or framework for executing the application.

The H/W type information includes at least one of GPU, NPU, or VPU, and the execution language includes at least one of a first execution language that requires compilation or a second execution language that does not require compilation.

The process is configured to define the application in the accelerated computing environment and then execute the application through the accelerated computing environment, when the execution language for the application is the first execution language that requires compilation, and execute the application through the accelerated computing environment, when the execution language for the application is the second execution language.

The first execution language includes at least one programming language of C language and Java or a language that requires compilation, and the second execution language includes at least one programming language of Python and NodeJS or a language that does not require compilation.

The code information of the application is information for executing the application set by a user through a UI provided by the user terminal device.

The UI includes at least one of a first icon for setting H/W, a second icon for setting an OS, a third icon for setting a programming language, a fourth icon for setting a software environment, a fifth icon for storing data, a sixth icon for setting a location to store a derived learning model, or a seventh icon for setting a source code for an algorithm used for learning in the learning model.

The processor is configured to control the communicator so as to transmit address information for providing an execution result of the application to the user terminal device, and provide the execution result of the application through the accelerated computing environment, when an access request to the address information is received from the user terminal device through the communicator.

As described above, according to the disclosure, the server providing various accelerated computing environments selects the resource suitable for executing the application and automatically define the accelerated computing environment based on the selected resource.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4A is a first illustrative diagram setting an accelerated computing environment for executing an application through a user interface (UI) provided by a user terminal device according to an embodiment of the disclosure;

FIG. 4B is a second illustrative diagram setting code information for executing an application through a UI provided by a user terminal device according to an embodiment of the disclosure.

Throughout the drawings, like reference numerals will be understood to refer to like parts, components, and structures.

DETAILED DESCRIPTION

Figure 1A:
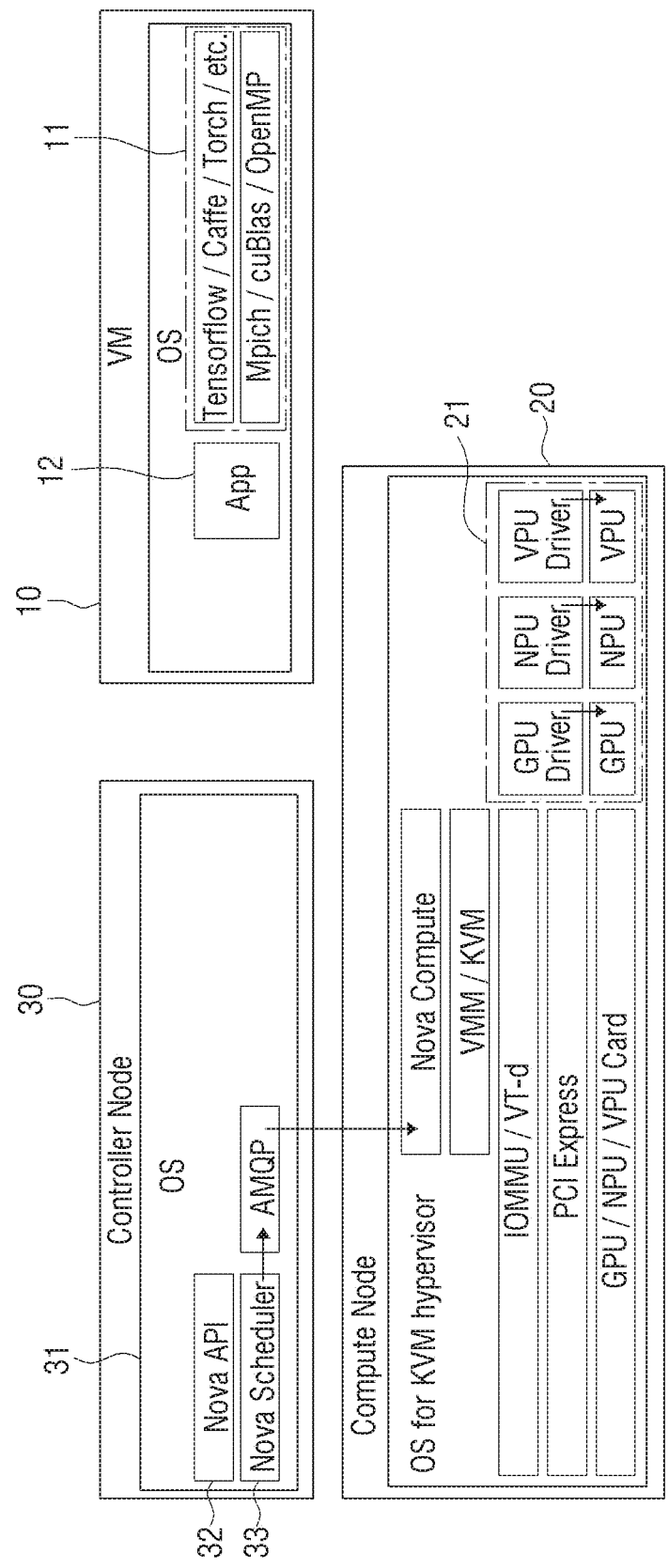
FIG. 1A is a first block diagram of a virtualization system for providing a computing environment for executing an application in a cloud environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, an expression "have", "may have", "include", "may include", or the like, indicates an existence of a corresponding feature (for example, a numerical value, a function, an operation, a component, such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may indicate all of (1) a case in which at least one A is included, (2) a case in which at least one B is included, or (3) a case in which both of at least one A and at least one B are included.

Expressions "first", "second", or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware (H/W). Instead, an expression "an apparatus configured to" may mean that the apparatus is "capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

An electronic apparatus according to various embodiments of the disclosure may include at least one of, for example, a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), an MP3 player, a medical device, a camera, or a wearable device. The wearable device may include at least one of an accessory type wearable device (for example, a watch, a ring, a bracelet, an anklet, a necklace, a glasses, a contact lens, or a head-mounted-device (HMD)), a textile or clothing integral type wearable device (for example, an electronic clothing), a body attachment type wearable device (for example, a skin pad or a tattoo), or a bio-implantable circuit. In some embodiments, the electronic apparatus may include at least one of, for example, a television, a digital video disc (DVD) player, an audio player, a refrigerator, an air conditioner, a cleaner, an oven, a microwave oven, a washing machine, an air cleaner, a set-top box, a home automation control panel, a security control panel, a media box (for example, HomeSync™ of Samsung Electronics Co., Ltd, TV™ of Apple Inc, or TV™ of Google™), a game console (for example Xbox™, PlayStation™), an electronic dictionary, an electronic key, a camcorder, or an electronic frame.

In other embodiments, the electronic apparatus may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, or Internet of things (IoT) devices (for example, a light bulb, various sensors, a sprinkler system, a fire alarm, a thermostat, a street light, a toaster, an exercise equipment, a hot water tank, a heater, a boiler, and the like).

In the disclosure, a term "user" may be a person that uses an electronic apparatus or an apparatus (e.g., an artificial intelligence (AI) electronic apparatus) that uses the electronic apparatus.

FIG. 1A is a first block diagram of a virtualization system for providing a computing environment for executing an application in a cloud environment according to an embodiment of the disclosure.

Referring to FIG. 1A, a virtualization system may include a virtual machine (VM) 10, a computing node device 20, and a controller node device 30.

The VM 10 may provide a virtual environment to emulate a computing environment for executing an application 12 developed by a user.

The computing node device 20 provides various resources for defining environments required to execute various applications 12, or manages resources of the VM 10 generated in the virtualization system. Such a computing node device 20 may perform a hypervisor function.

Specifically, the computing node device 20 performing the hypervisor function manages resources 21 that virtualize various H/W, such as graphics processing unit (GPU), numeric processing unit (NPU), vision processing unit (VPU), and the like, and provisions the VM 10 by using some of the resources.

Here, the provisioning of the VM 10 may mean connecting resources allocated to the VM 10 to a VM instance.

The controller node device 30 is a device that manages an operating system (OS) 31. For example, the controller node device 30 may provide an interface medium that connects other elements to an application program interface (API) such as OpenStack™ or Amazon Elastic Compute Cloud™ (EC2) API query through a Nova API 32. In an exemplary embodiment, a VM instance request may be provided to a Nova Scheduler 33 from a queue, and the controller node device 30 may determine that Nova is executed at a proper location.

Such a virtualization system of the related art including the VM 10, the computing node device 20, and the controller node device 30 may define an accelerated computing environment for executing an application 12 developed by the user through the following embodiments.

Specifically, the user may access the virtualization system through a terminal device (not illustrated) to execute the application 12. In an exemplary embodiment, the application 12 may be developed outside of the virtual system such as at the terminal device by the user. After accessing the virtualization system, the user may select H/W for executing the corresponding application 12 from various H/W available via the computing node device 20.

Accordingly, the VM 10 may install the H/W selected through the computing node device 20 on the VM 10.

Thereafter, the user may identify a framework and a program execution language to be installed for executing the application 12 on the VM 10. Thereafter, the user may upload the application 12 (e.g., executable code corresponding to the application) to the computing environment compiled defined within the VM 10.

Accordingly, the VM 10 defines the accelerated computing environment for executing the corresponding application 12 based on the application 12 uploaded by the user, the H/W selected by the user, and the framework and the program execution language installed by the user. Thereafter, the VM 10 may execute the application 12 developed by the user through the compiled accelerated computing environment.

Therefore, the user may confirm an execution result of the application 12 executed in the VM 10 through the own user terminal device 100 accessed to the virtualization system.

Figure 1B:
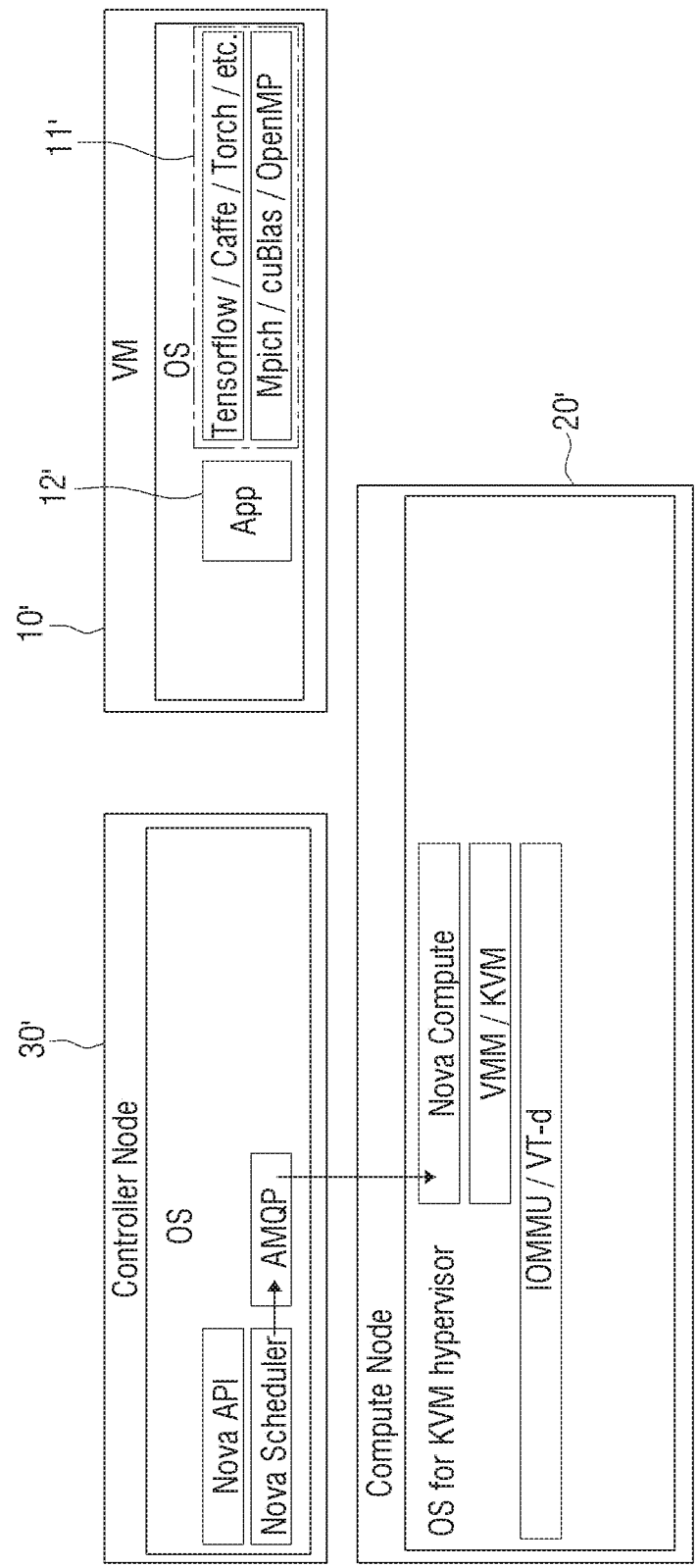
FIG. 1B is a second block diagram of a virtualization system for providing a computing environment for executing an application in a cloud environment according to an embodiment of the disclosure.

FIG. 1B is a second block diagram of a virtualization system for providing a computing environment for executing an application in a cloud environment according to an embodiment of the disclosure.

Referring to FIG. 1B, a virtualization system includes a VM 10', a computing node device 20', and a controller node device 30'.

Here, the VM 10', the computing node device 20', and the controller node device 30' have been described with reference to FIG. 1A, and a detailed description thereof will be omitted. The controller node device 30' is a device that manages an operating system (OS) 11'.

However, the computing node device 20' illustrated in FIG. 1B does not provide the resources for H/W, such as GPU, NPU, VPU, and the like, as described in FIG. 1A.

Therefore, the virtualization system illustrated in FIG. 1B may not provide the accelerated computing environment, such as the virtualization system illustrated in FIG. 1A.

Such a virtualization system including the VM 10', the computing node device 20', and the controller node device 30' illustrated in FIG. 1B may define an execution environment for an application 12' developed by the user through the following embodiments.

Specifically, the user may access the virtualization system through a terminal device (not illustrated) and select a program execution language for executing the corresponding application 12' among various resources provided by the computing node device 20.

Accordingly, the VM 10' installs the program execution language selected by the user through the computing node device 20'. Thereafter, the user uploads the application 12' developed by himself/herself on the VM 10'.

Accordingly, the VM 10' defines a computing environment for executing the corresponding application 12' based on the application uploaded by the user, and the program execution language selected by the user. Thereafter, the VM 10' may execute the application 12' developed by the user through the compiled computing environment.

Therefore, the user may confirm an execution result of the application executed in the VM 10' through the own user terminal device 100 accessed to the virtualization system.

The virtualization system of the related art described with reference to FIGS. 1A and 1B may define the accelerated computing environment or the computing environment for executing the corresponding application 12' on the VM 10 or 10' based on the selected executing resources, in a case that various executing resources for executing the application 12' developed by the user are selected by the user.

Hereinabove, the operation of providing the computing environment for executing the application 12' in the virtualization system of the related art has been described.

Hereinafter, a virtualization system for providing an accelerated computing environment in a cloud environment according to the disclosure will be described below.

Figure 2:
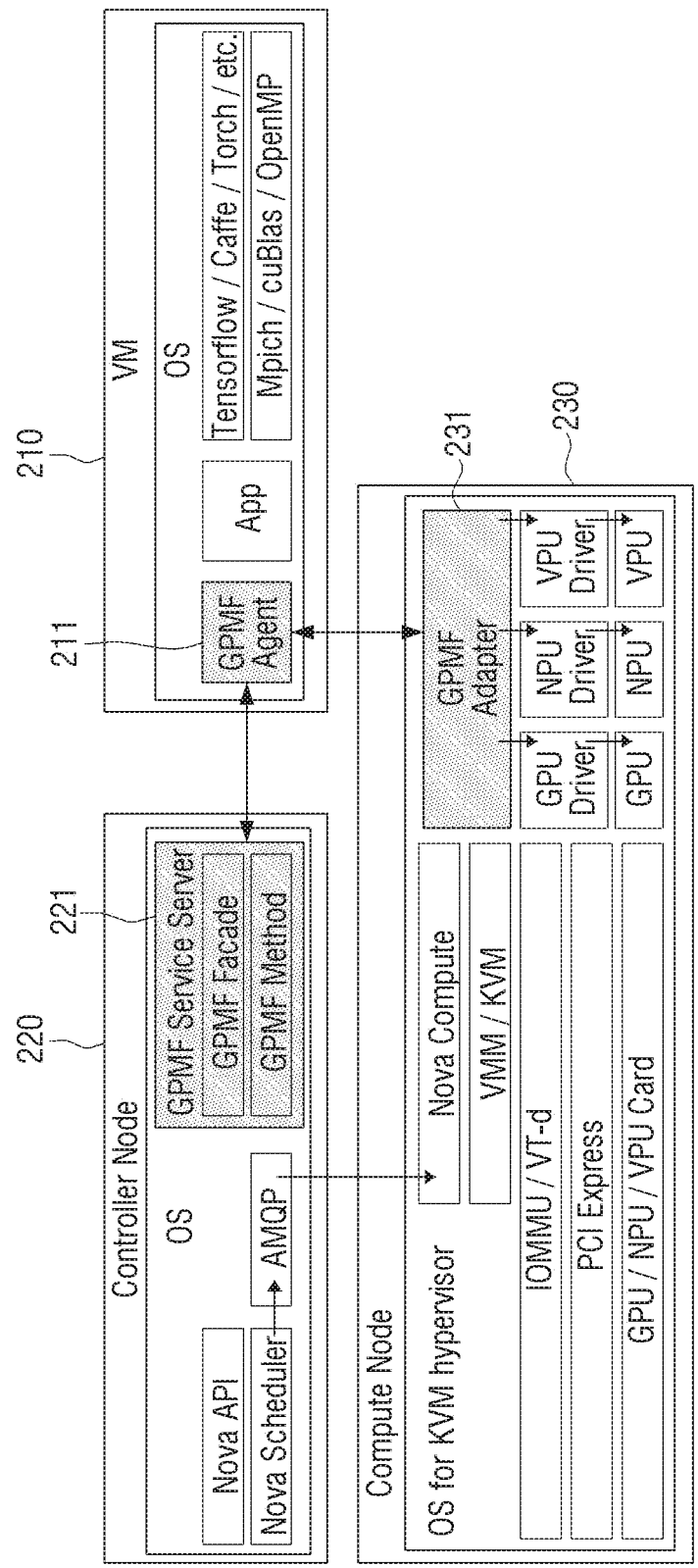
FIG. 2 is a block diagram of a virtualization system for providing an accelerated computing environment in a cloud environment according to an embodiment of the disclosure.

FIG. 2 is a block diagram of a virtualization system for providing an accelerated computing environment in a cloud environment according to an embodiment of the disclosure.

Referring to FIG. 2, a virtualization system according to the disclosure includes a VM 210, a controller node 220, and a computing node 230.

The basic description of the VM 210, the controller node 220, and the computing node device 230 has been described with reference to FIG. 1A, and the VM 210, the controller node 220, and the computing node device 230 will hereinafter be schematically described.

The VM 210 defines a multi-machine accelerated computing environment for executing an application developed by a user in a virtual environment.

Here, the multi-machine accelerated computing environment is a computing environment for executing the corresponding application by using a H/W resource suitable for executing the application developed by the user among a plurality of H/W resources, such as CPU, NPU, VPU, and the like.

In addition, the controller node 220, which is a device that manages an OS, provides a medium that may be connected to other elements to openstack API or EC2 API query through Nova API, performs a VM instance request from a queue through a Nova Scheduler, and determines that Nova is executed at a proper location.

The computing node device 230 provides resources that virtualize various H/W for defining environments required to execute various applications, or manages resources of the VM 210 generated in the virtualization system.

Meanwhile, the VM 210 according to the disclosure may include a general purpose management framework (GPMF) agent 211, the controller node 220 may include a GPMF service server 221, and the computing node 230 may include a GPMF adapter 231.

Therefore, the virtualization system according to the disclosure may provide the multi-machine accelerated computing environment through components included in each of the VM 210, the controller node 220, and the computing node 230 that configure the virtualization system.

The GPMF agent 211 installed on the VM 210 transmits code information on the application uploaded by the user to the GPMF service server 221 installed on the controller node 220, and defines the accelerated computing environment for executing the corresponding application based on execution information received from the GPMF service server 221.

The GPMF service server 221 installed on the controller node 220 analyzes the code information on the application received from the GPMF agent 211 to acquire the execution information required to execute the corresponding application, and transmits the acquired execution information to the GPMF agent 211.

The GPMF adapter 231 installed on the computing node 230 provides resources required to define the accelerated computing environment for executing the corresponding application based on the execution information received from the GPMF agent 211 to the GPMF agent 211.

Therefore, the GPMF agent 211 installed on the VM 210 may define the accelerated computing environment for executing the application uploaded by the user by using the resources received from the GPMF adapter 231.

Hereinabove, the virtualization system for providing the multi-machine accelerated computing environment in the cloud environment according to the disclosure has been schematically described.

Hereinafter, a server for providing a multi-machine accelerated computing environment in a cloud environment according to the disclosure will be described below.

Figure 3:
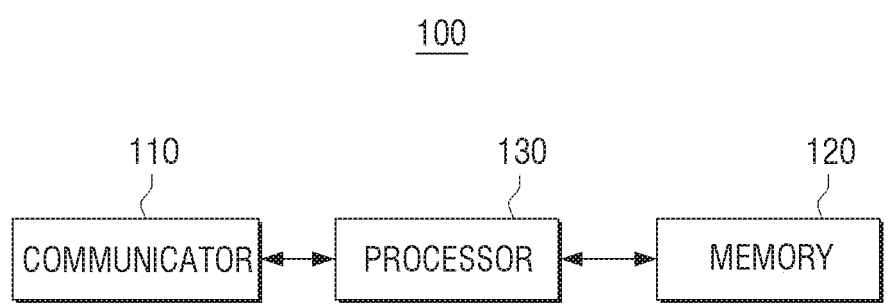
FIG. 3 is a block diagram of a server for providing an accelerated computing system according to an embodiment of the disclosure.

FIG. 3 is a block diagram of a server for providing an accelerated computing system according to an embodiment of the disclosure.

A server 100 for providing a multi-machine accelerated computing environment performs the operations of the VM 210 and the computing node 230 described with reference to FIG. 2.

Such a server 100 for providing the multi-machine accelerated computing environment includes a communicator 110, a memory 120, and a processor 130.

The communicator 110 including a circuit performs data communication with a user terminal device 300 and a service server (not illustrated). Such a communicator 110 may perform data communication with the user terminal device 300 and the service server (not illustrated) through various communication protocols, such as hypertext transfer protocol (HTTP), extensible messaging and presence protocol (XMPP), secure sockets layer (SSL), file transfer protocol (FTP), content centric networking (CCN), and the like.

However, the disclosure is not limited thereto, and the communicator 110 may perform data communication with the user terminal device 300 and the service server (not illustrated) depending on various wireless communication standards, such as Wi-Fi, 3rd generation (3G), 3rd generation partnership project (3GPP), long term evolution (LTE), and the like.

Here, the user terminal device 300 may be, for example, a portable terminal device, such as a smart phone, a tablet PC, or the like of the user, or a display device, such as a PC or a smart TV. In addition, the service server (not illustrated) may be the controller node device 220 described in FIG. 2.

The memory 120 includes at least one instruction for executing the server 100. In particular, if the resources for the accelerated computing environment provided by the computing node device 230 described in FIG. 2 are implemented by software, the memory 120 may store the corresponding software.

The processor 130 executes at least one instruction stored in the memory 120. In particular, if the application uploaded from the user terminal device 300 through the communicator 110 is received, the processor 130 controls the communicator 110 so as to transmit code information on the application to the service server (not illustrated).

Accordingly, the communicator 110 transmits the code information on the application to the service server (not illustrated).

Meanwhile, if execution information for executing the application acquired based on the code information is received from the service server (not illustrated), the processor 130 defines an accelerated computing environment for executing the application based on the received execution information and executes the application in the compiled accelerated computing environment.

Specifically, if the execution information for executing the application is received, the processor 130 acquires resources required to define the accelerated computing environment for executing the application from the memory 120 based on the received execution information, and defines the accelerated computing environment for executing the application by using the acquired resources.

Meanwhile, if the computing node device 230 for providing the resources for the accelerated computing environment described in FIG. 2 is implemented by separate H/W, the processor 130 may receive resources required to define the accelerated computing environment for executing the application from the computing node device 230 based on the received execution information.

Meanwhile, the execution information described above may include at least one of H/W type information, execution language information, or a framework for executing an application.

The H/W type information may include at least one of GPU, NPU, or VPU.

Therefore, the processor 130 may acquire resources corresponding to the H/W type information, the execution language information, and the framework included in such execution information through the memory 120 or the computing node device 230 implemented by separate H/W, and may define the accelerated computing environment for executing the application by using the acquired resources.

Meanwhile, the execution language information described above may include at least one of a first execution language that requires compilation or a second execution language that does not require compilation.

Here, the first execution language may include at least one programming language of C language and Java or a language that requires compilation, and the second execution language may include at least one programming language of Python and NodeJS or a language that does not require compilation.

Therefore, if the execution information for executing the application is received, the processor 130 determines whether an execution language for the application is the first execution language that requires compilation or the second execution language that does not require compilation based on execution language information included in the received execution information.

As a result of the determination, if the execution language is the first execution language that requires compilation, the processor 130 defines an application in the compiled accelerated computing environment based on the execution information, and then executes the corresponding application through the accelerated computing environment.

Meanwhile, if the execution language for the application is the second execution language that does not require compilation, the processor 130 executes the application through the compiled accelerated computing environment based on the execution information.

Specifically, if the accelerated computing environment for executing the application is built, the processor 130 controls the communicator 110 so as to transmit address information for providing an execution result of the application to the user terminal device 300 through the corresponding accelerated computing environment. Accordingly, the communicator 110 transmits the address information for providing the execution result of the application to the user terminal device 300.

Thereafter, an access request to the address information transmitted to the user terminal device 300 from the user terminal device 300 is received, the processor 130 may provide an execution result of the application uploaded by the user through a pre-compiled accelerated computing environment.

Meanwhile, the code information of the application described above may be information for executing an application set by the user through a user interface (UI) provided by the user terminal device 300.

Such a UI may include at least one of a first icon for setting H/W, a second icon for setting OS, a third icon for setting a programming language, a fourth icon for setting a software environment, a fifth icon for storing data, a sixth icon for setting a location to store a derived learning model, or a seventh icon for setting a source code for an algorithm used for learning in the learning model.

Therefore, the user may set the code information for executing the application developed by himself/herself through the UI provided by the user terminal device 300.

Hereinafter, the UI provided by the user terminal device 300 will be described below.

FIG. 4A is a first illustrative diagram setting an accelerated computing environment for executing an application through a UI provided by a user terminal device according to an embodiment of the disclosure and FIG. 4B is a second illustrative diagram setting code information for executing an application through a UI provided by a user terminal device according to another embodiment of the disclosure.

Referring to FIG. 4A, the user terminal device 300 may display a UI 410 for setting an accelerated computing environment for executing an application on a screen.

Here, the UI 410 displayed on the screen may include at least one of a first icon for setting H/W, a second icon for setting OS, a third icon for setting a programming language, a fourth icon for setting a software environment, a fifth icon for storing data, a sixth icon for setting a location to store a derived learning model, or a seventh icon for setting a source code for an algorithm used for learning in the learning model.

Therefore, the user may set the accelerated computing environment for executing the application developed by himself/herself through the UI 410 displayed on the screen of the user terminal device 300.

As illustrated, the user may select the number of GPU H/W as "4" through the first icon for setting H/W, select an OS and version related to "Ubuntu" Linux through the second icon for setting OS, select the "CUDA" and "Pyton" programming languages and versions through the third icon for setting the programming language, and select the "Tensorflow" open source software and version through the fourth icon for setting the software environment.

As described above, if the H/W, the OS, the programming language, and the software environment are set by the user, the server 100 may define the accelerated computing environment for executing the application developed by the user based on the code information corresponding to the H/W, the OS, the programming language, and the software environment set by the user.

Additionally, the user may select the "Common Data" data storage location through the fifth icon for storing data included in the UI 410 displayed on the screen of the user terminal device 300, select a location to store the "Common Repo." learning model through the sixth icon for setting the location to store the derived learning model, and select the "Github Repo." source code through the seventh icon for setting the source code for the algorithm used for learning in the learning model.

As described above, if the data storage location, the learning model storage location, and the source code for the algorithm used in the learning model are set by the user, the server 100 may perform an AI learning training generated based on the data storage location, the learning model storage location, and the source code for the algorithm used in the learning model which are set by the user in the accelerated computing environment compiled based on a user setting command.

Meanwhile, the server 100 may define a higher performance accelerated computing environment than the accelerated computing environment compiled through the description of FIG. 4A through the following embodiments.

Referring to FIG. 4B, the user terminal device 300 may display a UI 420 for setting an accelerated computing environment for executing an application on a screen.

As described above, the UI 420 displayed on the screen may include at least one of a first icon for setting H/W, a second icon for setting OS, a third icon for setting a programming language, a fourth icon for setting a software environment, a fifth icon for storing data, a sixth icon for setting a location to store a derived learning model, or a seventh icon for setting a source code for an algorithm used for learning in the learning model.

Meanwhile, in order to define a high performance accelerated computing environment, the user may select the number of used GPU H/W as "32" through the first icon for setting H/W.

As described above, if a larger number of used GPU H/W is selected, the user terminal device 300 automatically sets code information suitable for the high performance accelerated computing environment based on the selected large amount of GPU H/W.

As illustrated, if the number of used GPU H/W is selected as "32", the user terminal device 300 selects the OS type and version as "Ubuntu" and "Version 16.04", selects the programming language type and version as "CUDA, Python" and "Version 9.1, Version 3.5", and sets the framework type and version as "Horovod" and "Version 0.15.1" through the UI 420 displayed on the screen.

As described above, if the code information for defining the high performance accelerated computing environment is set, the server 100 may define the high performance accelerated computing environment for executing the application developed by the user based on the set code information.

Meanwhile, the code information related to the AI leaning training may be used as the information set by the user in FIG. 4A. Therefore, the server 100 may perform the AI leaning training generated based on the data storage location, the learning model storage location, and the source code for the algorithm used in the learning model which are set by the user in the high performance accelerated computing environment in FIG. 4A.

Hereinafter, a control method of a server 100 for providing a multi-machine accelerated computing environment in a cloud environment according to the disclosure will be described below.

Figure 5:
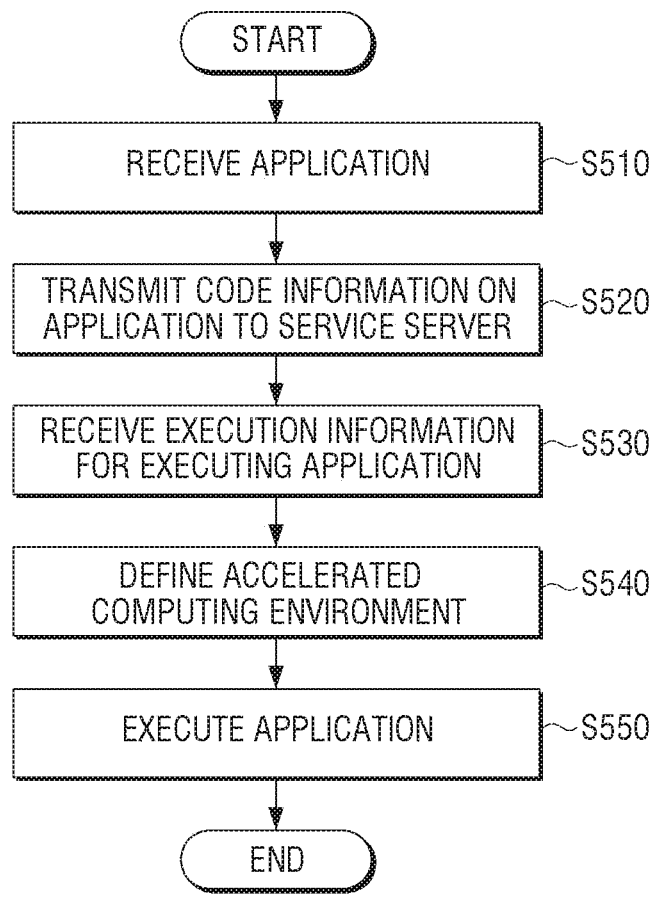
FIG. 5 is a flowchart of a control method of a server for providing an accelerated computing environment in a cloud environment according to an embodiment of the disclosure.

FIG. 5 is a flowchart of a control method of a server for providing an accelerated computing environment in a cloud environment according to an embodiment of the disclosure.

Referring to FIG. 5, if the server 100 receives the application uploaded from the user from the user terminal device 300, the server 100 transmits code information on the received application to a service server (not illustrated) in operations S510 and S520.

Here, the service server (not illustrated) may be the controller node device 220 described in FIG. 2.

Thereafter, if the server 100 receives execution information for executing the application acquired based on the code information from the service server (not illustrated), the server 100 defines an accelerated computing environment for executing the application based on the received execution information in operations S530 and S540.

Thereafter, the server 100 executes the application received from the user terminal device 300 in the compiled accelerated computing environment in operation S550.

Here, the execution information for executing the application may include at least one of H/W type information, execution language information, or framework for executing an application.

The H/W type information may include at least one of GPU, NPU, or VPU.

Therefore, the server 100 acquires resources corresponding to the H/W type information, the execution language information, and the framework included in such execution information through the memory 120 compiled therein or the computing node device 230 implemented by separate H/W, and defines the accelerated computing environment for executing the application by using the acquired resources.

Meanwhile, the execution language information may include at least one of a first execution language that requires compilation or a second execution language that does not require compilation.

Here, the first execution language may include at least one programming language of C language, Java, or a language that requires compilation, and the second execution language may include at least one programming language of Python, NodeJS, and a language that does not require compilation.

Therefore, if the server 100 receives the execution information for executing the application, the server 100 determines whether an execution language for the application is the first execution language that requires compilation or the second execution language that does not require compilation based on execution language information included in the received execution information.

As a result of the determination, if the execution language is the first execution language that requires compilation, the server 100 defines an application in the compiled accelerated computing environment based on the execution information, and then executes the corresponding application through the accelerated computing environment.

Meanwhile, if the execution language for the application is the second execution language that does not require compilation, the server 100 executes the application through the compiled accelerated computing environment based on the execution information.

Specifically, if the accelerated computing environment for executing the application is built, the server 100 transmits address information for providing an execution result of the application to the user terminal device 300 through the corresponding accelerated computing environment.

Thereafter, if the server 100 receives an access request to the address information transmitted to the user terminal device 300 from the user terminal device 300, the server 100 may provide an execution result of the application uploaded by the user through a pre-compiled accelerated computing environment.

Meanwhile, the code information of the application described above may be information for executing an application set by the user through the UI provided by the user terminal device 300.

Such a UI may include at least one of a first icon for setting H/W, a second icon for setting OS, a third icon for setting a programming language, a fourth icon for setting a software environment, a fifth icon for storing data, a sixth icon for setting a location to store a derived learning model, or a seventh icon for setting a source code for an algorithm used for learning in the learning model.

Therefore, the user may set the code information for executing the application developed by himself/herself through the UI provided by the user terminal device 300.

The diverse embodiments of the disclosure may be implemented by software including instructions that are stored in machine-readable storage media (e.g., a computer). The machine is an apparatus that calls the stored instructions from the storage media and is operable according to the called instructions, and may include an electronic apparatus (e.g., the electronic apparatus 100) according to the disclosed embodiments. When the instructions are executed by the processor, the processor may perform functions corresponding to the instructions, either directly or using other components under the control of the processor. The instructions may include codes generated or executed by a compiler or an interpreter. The machine-readable storage media may be provided in the form of non-transitory storage media. Here, the terms 'non-transitory' means that the storage media does not include a signal and is tangible, but does not distinguish whether data is stored semi-permanently or temporarily in the storage media.

According to an embodiment, the method according to the diverse embodiments disclosed in the disclosure may be included and provided in a computer program product. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In case of the online distribution, at least a portion of the computer program product may be at least temporarily stored in a storage medium, such as a memory of a server of a manufacturer, a server of an application store, or a relay server, or be temporarily generated.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component, in accordance with the diverse embodiments may be performed in a sequential, parallel, iterative, or heuristic manner, or at least some operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A controlling method of a server for defining an accelerated computing environment in a cloud environment having a computing node device, the method comprising the server performing operations of:
    receiving code information associated with an application uploaded from a terminal device, the code information including information for executing the application;
    transmitting the code information associated with the application, to a controller node device within the cloud environment, wherein the controller node device analyzing the code information to acquire an execution information required to execute the application;

receiving from the controller node device, the execution information, wherein the execution information including: execution language information, hardware (H/W) type information and framework for executing the application;

receiving from the computing node device, resources required to define the accelerated computing environment;

defining the accelerated computing environment for executing the application based on the received execution information;

determining whether an execution language for the application is a first execution language that requires compilation or a second execution language that does not require compilation based on the execution language information included in the received execution information, the second execution language being non compiled language;

when the execution language information is the first execution language, compiling and executing, by the server, the application in the defined accelerated computing environment; and when the execution language information is the second execution language, executing, by the server, the application in the defined accelerated computing environment without compiling the application, wherein the executing of the application further comprises:
transmitting, to the terminal device, address information for providing an execution result of the application, and
when an access request to the address information is received from the terminal device, providing the execution result of the application, wherein the code information associated with the application includes information for executing the application received at a user interface (UI) provided by the terminal device, and wherein the UI includes an icon for receiving information on a learning model to be executed in the defined accelerated computing environment.

2. The method as claimed in claim 1,
wherein the H/W type information includes information associated with at least one of a graphics processing unit (GPU), a numeric processing unit (NPU), or a vision processing unit (VPU).

3. The method as claimed in claim 2,
wherein the first execution language includes at least one programming language of C language, Java, or a language that requires compilation, and
wherein the second execution language includes at least one programming language of Python, NodeJS, or a language that does not require compilation.

4. The method as claimed in claim 1, wherein the UI includes at least one of:
a first icon for identifying hardware (H/W),
a second icon for identifying an operating system (OS),
a third icon for identifying a programming language,
a fourth icon for identifying a software environment,
a fifth icon for storing data,
a sixth icon for identifying a location to store a derived learning model, or
a seventh icon for identifying a source code for an algorithm used for learning in the derived learning model.

5. A server for defining an accelerated computing environment in a cloud environment having a computing node device, the server comprising:
a communicator configured to include a circuit;
a memory configured to include at least one instruction; and
a processor configured to execute the at least one instruction,
wherein the processor is configured to:
control the communicator to receive code information associated with an application uploaded from a terminal device, the code information including information for executing the application,
control the communicator to transmit the code information associated with the application to a controller node device within the cloud environment, wherein the controller node device analyzing the code information to acquire an execution information required to execute the application,
control the communicator to receive, from the controller node device, the execution information, wherein the execution information including: execution language information, hardware (H/W) type information and framework for executing the application,
receive from the computing node device, resources required to define the accelerated computing environment,
define the accelerated computing environment for executing the application based on the received execution information,
determine whether an execution language for the application is a first execution language that requires compilation or a second execution language that does not require compilation based on the execution language information included in the received execution information, the second execution language being non compiled language,
when the execution language information is the first execution language, compile and executing the application in the defined accelerated computing environment, and
when the execution language information is the second execution language, execute the application in the defined accelerated computing environment without compiling the application, and
wherein the processor is further configured to:
transmit, to the terminal device, address information for providing an execution result of the application, and
when an access request to the address information is received from the terminal device, provide the execution result of the application,
wherein the code information associated with the application includes information for executing the application received at a user interface (UI) provided by the terminal device, and
wherein the UI includes an icon for receiving information on a learning model to be executed in the defined accelerated computing environment.

6. The server as claimed in claim 5,
wherein the H/W type information includes at least one of a graphics processing unit (GPU), a numeric processing unit (NPU), or a vision processing unit (VPU).

7. The server as claimed in claim 6,
wherein the first execution language includes at least one programming language of C language, Java, or a language that requires compilation, and wherein the second execution language includes at least one programming language of Python, NodeJS, or a language that does not require compilation.

8. The server as claimed in claim 6, wherein the UI includes at least one of:
a first icon for identifying hardware (H/W),
a second icon for identifying an operating system (OS),
a third icon for identifying a programming language,
a fourth icon for identifying a software environment,
a fifth icon for storing data,
a sixth icon for identifying a location to store a derived learning model, or
a seventh icon for identifying a source code for an algorithm used for learning in the derived learning model.

* * * * *